United States Patent [19]
Tipton

[11] Patent Number: 5,838,078
[45] Date of Patent: Nov. 17, 1998

[54] APPARATUS AND SYSTEMS THAT INTERFACE TO FACILITIES AND EQUIPMENT THAT PROVIDE TEMPORARY ELECTRIC UTILITIES TO CONSTRUCTION SITES

[75] Inventor: James D. Tipton, Mansfield, Tex.

[73] Assignee: Basic Resources, Inc., Dallas, Tex.

[21] Appl. No.: 756,206

[22] Filed: Nov. 25, 1996

[51] Int. Cl.[6] .................................................. H02B 1/26
[52] U.S. Cl. ........................ 307/147; 361/641; 361/643; 174/38
[58] Field of Search .................................... 361/641, 643, 361/647, 622, 660; 174/38, 37, 39, 52.1; 307/147

[56] References Cited

U.S. PATENT DOCUMENTS

| | | | |
|---|---|---|---|
| 3,585,456 | 6/1971 | Phillips, Jr. ............................ | 361/663 |
| 3,906,295 | 9/1975 | Tessmer ................................. | 361/643 |
| 4,266,266 | 5/1981 | Sanner ................................... | 361/643 |
| 4,785,376 | 11/1988 | Dively .................................... | 361/622 |
| 5,184,279 | 2/1993 | Horn ...................................... | 361/641 |
| 5,335,160 | 8/1994 | Savoca ................................... | 362/431 |
| 5,400,212 | 3/1995 | Hanson .................................. | 361/665 |
| 5,404,266 | 4/1995 | Orchard et al. ........................ | 361/667 |

*Primary Examiner*—William M. Shoop, Jr.
*Assistant Examiner*—Jonathan S. Kaplan
*Attorney, Agent, or Firm*—R. Darryl Burke; Worsham, Forsythe & Wooldridge

[57] ABSTRACT

An electrical interface is comprised of permanent electrical facilities and a temporary electrical facility. The permanent electrical facilities provide electrical power to a residential neighborhood. The temporary electrical facility electrically is connected to the permanent electrical facilities and provides electrical utilities to construction sites. The temporary electrical facility is comprised of a first housing, at least one electrical breaker, and at least one electrical plug. The electrical breaker and the electrical plug are positioned in and enclosed within the first housing is such a manner that the at least one electrical breaker and the at least one electrical plug can be accessed from a position exterior to the first housing. The at least one electrical breaker electrically is coupled to the permanent electrical facilities and to the at least one electrical plug in such a manner as to selectively switch power to and from the at least one electrical plug. A process comprises the following steps: (a) locating and positioning a stand alone electrical facility in proximity to a permanent electrical facility, (b) digging a hole in which to place a first end of the stand alone electrical facility and digging a trench that extends from the permanent electrical facility to the hole; (c) placing conduit housing an electrical cable in the trench; and (d) setting the stand alone electrical facility in the hole and laying the conduit housing the electrical cable in the trench; (e) filling in the hole around the first end of the stand alone electrical facility and filling in the trench; and (f) placing the electrical cable in the hollow pole and electrically connecting the electrical cable to the permanent electrical facility.

35 Claims, 9 Drawing Sheets

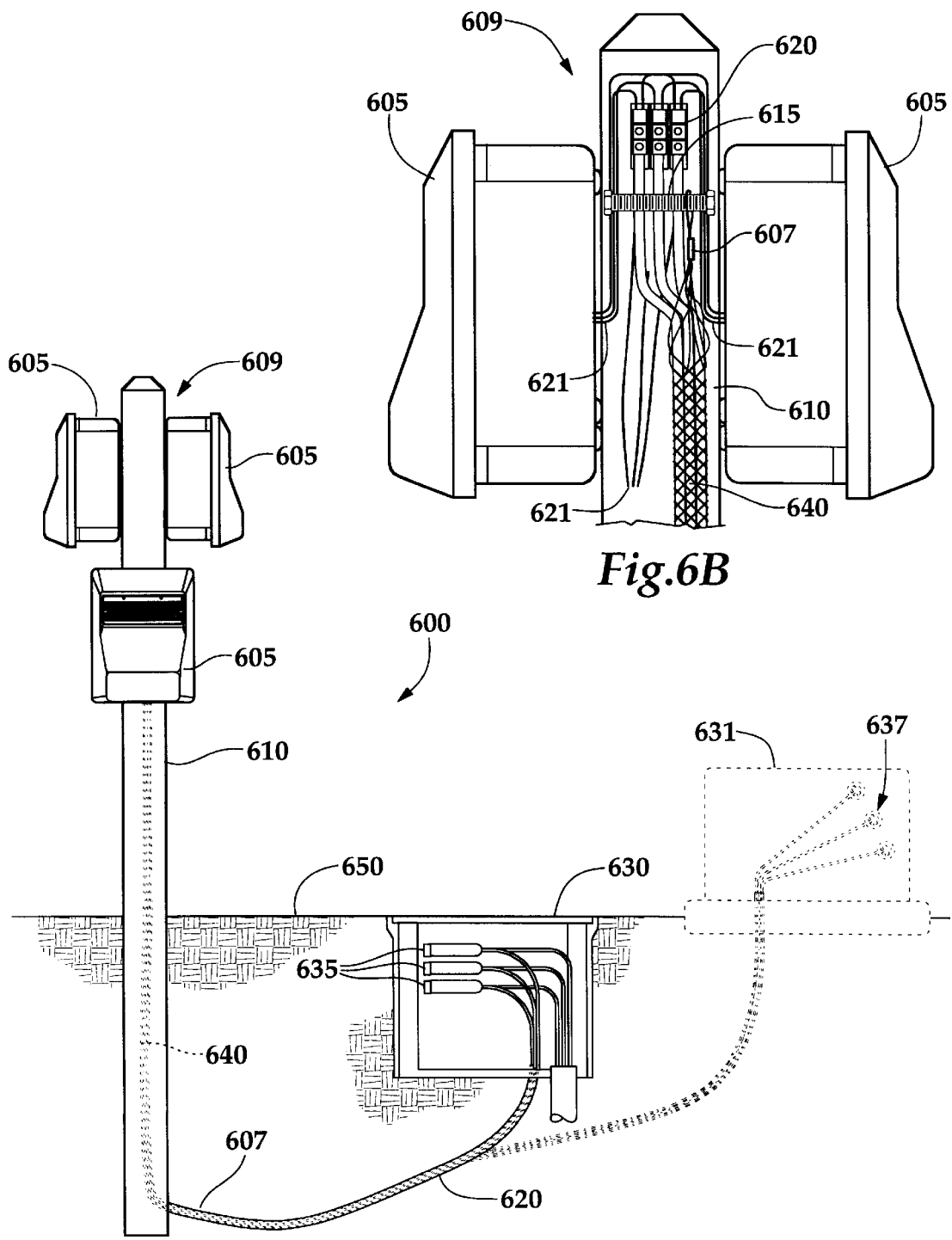

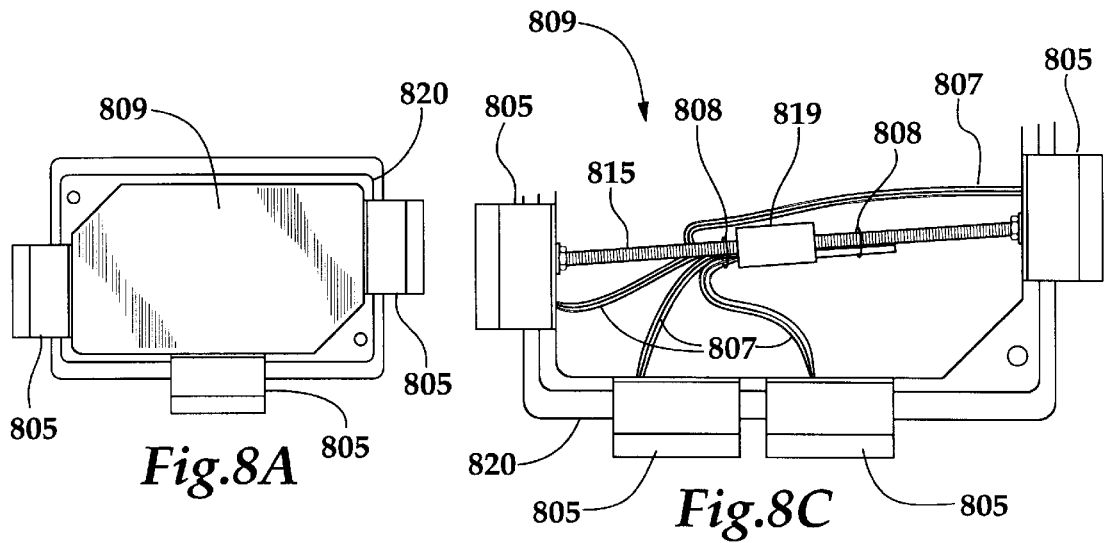
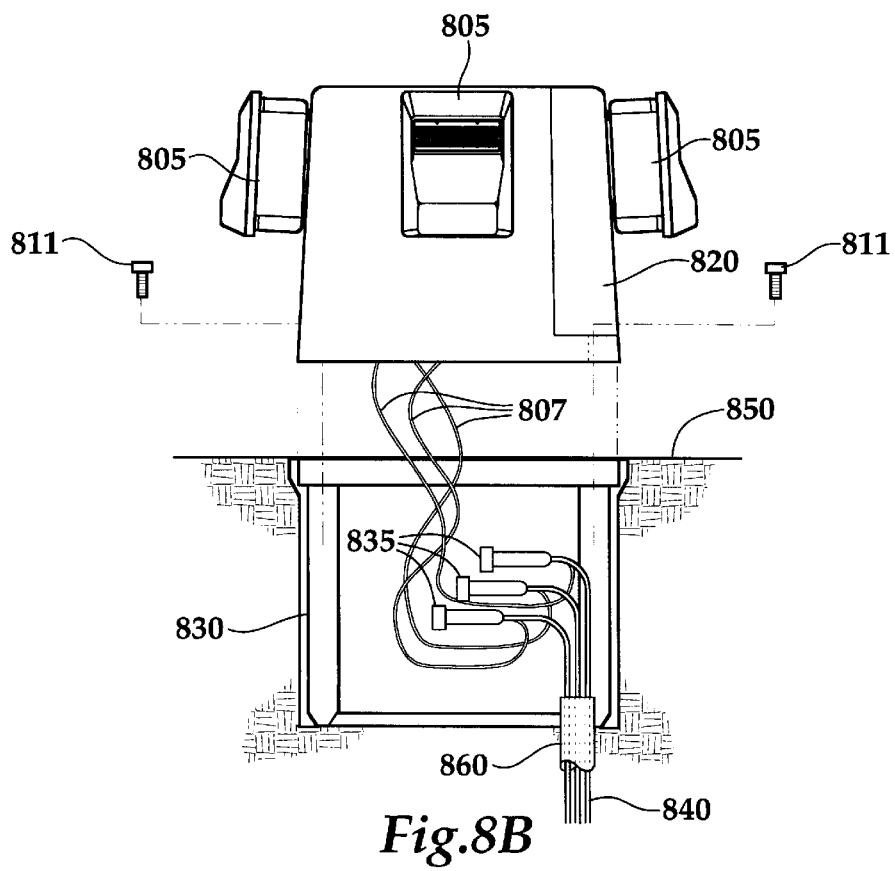
Fig.8A
Fig.8C
Fig.8B 5,838,078

APPARATUS AND SYSTEMS THAT INTERFACE TO FACILITIES AND EQUIPMENT THAT PROVIDE TEMPORARY ELECTRIC UTILITIES TO CONSTRUCTION SITES

PARTIAL WAIVER OF COPYRIGHT PURSUANT TO 1077 O.G. 22(Mar. 20, 1987)

© Copyright. 1996. Basic Resources, Inc. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

FIELD OF INVENTION

The present invention generally relates to the field of electrical equipment used by electrical utilities and their customers to provide temporary and permanent electrical service.

BACKGROUND

Most construction projects require a power source of some sort at the actual construction site. Power must be provided by temporary generators or by actual electrical connections to the power grid. Unfortunately, temporary generators are expensive and do not generally provide enough power to energize large-scale construction projects, such as the development of an entire residential neighborhood. As a result, most builders prefer or request that electrical facilities be constructed that allow them to use power supplied from electrical companies. Consequently, temporary electrical facilities are usually installed by the local electric utility company that allow a builder to access semi-permanent facilities or permanent facilities. FIGS. 1A, 1B, 1C, and 1D show various examples and views of temporary electrical facilities that have been used in the past. Specifically, FIGS. 1A and 1B show side and top cross-sectional views of a temporary service pole 100 having an overhead secondary electrical connection wires 112. FIG. 1C shows a cross-sectional view of a temporary service pole 100 having underground secondary electrical connection cables 111. FIG. 1D shows a frontal view of temporary service pole 100, showing meter base 104, breaker box 106, and plug boxes 108A and 108B on pole 120.

As a general rule, when a builder is ready to begin construction, the builder's electrician sets temporary service pole 100, such as that shown in FIGS. 1A, 1B, and 1C, in close proximity to the electric utility's facilities and the construction site (e.g., a transformer, a hand hole or pedestal), so that when temporary service pole 100 is energized, electrical power can be activated and supplied to various workman at the construction site. Temporary service pole 100, however, is not active or energized (i.e., turned "on") upon installation. As discussed below, in view of the fact that existing temporary service poles 100 are so dangerous, a number of cities and municipalities throughout the country have enacted strict regulations governing the installation and activation of such temporary service poles 100. These regulations and procedures and the corresponding inspections create significant delays for the builder and thereby cost considerable amounts of money.

As stated above, existing temporary service poles 100 have a number of safety related concerns. For instance, besides being merely placed inside some sort of enclosed conduit 116, electrical wiring 118 is exposed to the environment, and, over time, electrical wiring 118 rubs against enclosed conduit 116 and may become exposed. Simultaneously, enclosed conduit 116 itself often cracks, exposing electrical wiring 118 therein. Since poles 120 are usually just wooden boards or posts, poles 120 do not offer any additional protection to wiring 118 whatsoever. This is especially significant in view of the fact that temporary services poles 100 are often reused over and over again and that the weather, especially the warm weather in the southern and southwestern regions of the United States, affects the integrity of enclosed conduit 116 and wiring 118. Similarly, breaker box 106 and plug boxes 108A and 108B are generally metallic and conductive and, therefore, if not properly grounded, can be quite dangerous. In addition, breaker box 106 and plug boxes 108A and 108B are not tamper resistant in that both boxes can be easily opened, reconfigured, and hardwired, which, as discussed below, is troublesome and, unfortunately, quite common.

Procedural delays associated with existing temporary designs are problematic. Coordinating the inspection and activation of each temporary service pole 100 generally takes a considerable amount of time and effort and contributes to the overall inefficiency of providing energy to construction sites, especially in light of the fact that the following procedure must be performed for each and every temporary service pole 100 in a residential subdivision. Specifically, after a builder sets a temporary service pole 100, the builder then must apply for the construction electric service to the electric utility company and also request an inspection of temporary service pole 100 by the local governing electrical authority (usually the city). After approval by the local electrical inspection authority, the builder requests the electric utility service company to connect temporary service pole 100 into the electrical grid used to deliver electricity (e.g., to a transformer or to a hand hole or pedestal (not shown)). The electrical utility then issues an order to a crew to go to the location and connect the service by energizing temporary service pole 100. Overhead wires 112 (in FIGS. 1A and 1B) or underground cables 111 (in FIG. 1C) for the service pole connection is provided by the builder and is inspected by the local governing electrical authority, but the actual connecting of overhead wires 112 or underground cable 111 is made by the electrical utility's crew to ensure that the overall system integrity is not compromised. There are bureaucratic delays associated with each step of this process and these delays are quite costly to a builder and, ultimately, to the future owner, as construction crews are often forced to simply stop and wait.

In addition, note that since the local governing authority inspects temporary service pole 100 before temporary service pole 100 is energized and does not return thereafter to reinspect temporary service pole 100 after temporary service pole 100 has been energized, the local governing electrical authority does not inspect or otherwise test the electrical operation of any of the electrical components in breaker box 106 or plug boxes 108A and 108B, much less meter base 104. Consequently, the inspection performed by the local governing electrical authority is largely structural and/or visual in nature (e.g., Is the temporary service pole 100 secure? Is there any loose wiring?). From an electrical perspective, the inspection is premature. Moreover, while the electric utility service company generally checks meter base 104, the electric utility service company does not ordinarily inspect or test the electrical operation of any of the electrical components in breaker box 106 or in plug boxes 108A and 108B. As a result, breaker box 106, plug boxes 108A and 108B, and any other additional electrical connections therebetween or between breaker box 106 and plug boxes 108A and 108B and other electrical components are not routinely inspected or checked by anyone after being energized and do, sometimes, fail. When any one of the electrical components fail, in view of the pressures on workmen at a construction site to complete a project on time and the relative ease in which breaker box 106, plug boxes 108A and 108B, and electrical wiring 118 can be opened and accessed, temporary construction poles 100 are readily and often tampered with by construction workmen. This compounds the dangers associated with existing temporary service pole 100, which were discussed above.

Existing designs and procedures have other problems as well.

SUMMARY

The disclosed invention pertains to an apparatus and related methods and systems that are used to provide an electrical interface to the electric utility's facilities/equipment (e.g., transformers, pedestal and hand holes). Preferred embodiments provide temporary electrical service to a construction site when a builder desires the electrical service without compromising permanent electrical equipment that are necessary to provide future utility services.

Preferred embodiments generally comprise permanent electrical facilities that provide electrical power to a residential neighborhood or similar building, structure, or location and a temporary electrical facility that is electrically connected to the permanent electrical facilities. The temporary electrical facility is preferably used to provide electrical service and utilities to construction sites. Preferred embodiments of the temporary electrical facility are further comprised of a first housing, a base, a second housing, electrical sockets (or plugs), and electrical breakers. The second housing is non-conductive and in the first preferred embodiment fits over and closes the base. A meter base is not generally needed. Note there are many versions of the first preferred embodiment, but generally, electrical sockets (e.g. plugs) and electrical breakers are positioned in the first housing, which is positioned and/or attached to an exterior surface of the second housing. Distribution block(s) is(are) sometimes used to divide or direct wiring among various electrical breakers and electrical sockets and/or between various temporary electrical facilities. The distribution block may be positioned in the first housing and is used to convert and properly direct the conductive wiring to electrical sockets and electrical breakers. The conductive wiring is electrically connected to electrical cables via the distribution block(s), which are, in turn, electrically connected to the permanent electrical facilities. Electrical cables may be extended overhead or positioned underground. Underground cables are encased in conduit. The first housing is also preferably comprised of substantially non-conductive materials. The electrical sockets and breakers are secured to and within the first housing and indirectly to the pole with tamper resistant hardware to prevent disassembly in the field. The electrical sockets and breakers may be mounted to a plate that is comprised of metal and is conductive. The plate may also have a special separate grounding stud for added safety. Securing hardware secures an internal wiring harness to hold the conduit and a second distribution block (if needed) in place inside the second housing to distribute energy (or electricity) from the electrical cable to the electrical sockets and breakers in the first housing. The first housing also preferably has a hinged lid that covers and protects the electrical sockets and the electrical breakers and can be sealed or locked. Alternate preferred embodiments of temporary electrical facilities comprise a pole, a first housing, electrical sockets, and electrical breakers. Similar to the first preferred embodiment, electrical sockets and electrical breakers are positioned inside the first housing and the first housing is positioned on an exterior surface of the pole. The pole is hollow and electrical wiring connecting the electrical components in the first housing to the permanent electrical facilities is preferably positioned inside the hollow pole. The first housing and/or pole is(are) preferably comprised of materials selected from a group consisting of fiberglass and assorted polymers, including plastics, and is a light color.

Preferred processes of installing preferred embodiments generally comprise digging a trench and placing the conduit holding the electrical cable therein. If necessary, the additional step of digging a hole may be added to hold the preferred embodiment using a pole. Also, if applicable, the existing cover over the base is removed and replaced with an appropriate cover or second housing for the particular structure. The pole and/or second housing already preferably has the first housing with the electrical components attached or positioned therein.

Preferred embodiments provide a number of advantages. Preferred embodiments are retrievable, reusable, and easily assembled and installed. Preferred embodiments reduce the time required to provide electrical power to construction sites. Specifically, preferred embodiments eliminate the necessity of sending crews to the location to provide construction/temporary service that enables the electric utility to eliminate approximately 50% of the trips normally needed at a location. This preferred embodiment provides energy to the construction site and interconnects the site to the electrical utility system with minimal involvement from the electric utility and local governing authority whatsoever. In light of the fact that the largest portion of the time delay associated with providing power to construction sites is attributed to the time it takes to notify and get the utility crew to the location to make the needed electrical connections to energize the service, any improvements that streamline this process dramatically reduces the overall time allotment as well. This also substantially reduces the overall costs, since a utility crew is only needed to install the equipment providing the temporary service and the permanent service and to remove the equipment providing the temporary service when construction is complete.

And, preferred embodiments are easily installed and removed. Consequently, preferred embodiments expedite the start of construction for the builder and enable electric utility companies (and/or alternate suppliers of electricity) to restructure their rates and to lower costs by using flat rate pricing and block use energy costing. This capability afforded by preferred embodiments virtually eliminates the need to meter the usage of electricity of builders and to monthly bill builders, which represents a fundamental and dramatic change in the way electric utilities have operated and billed customers for many decades. The importance of this change should not be underestimated and, in fact, could be viewed as revolutionary. The savings pertaining to manpower alone are tremendous.

Also, electrical inspecting authorities of various cities are open to some of these changes in the way electric utilities have operated in the past, in part because they are generally receptive to the idea of letting the electric utility provide the temporary service to the construction sites because of the following reasons. First, the cities would no longer inspect the temporary services facilities since it would be furnished by the electric utility, thus saving the inspection time associated with the temporary service. Second, the cities would substantially avoid any liability associated with the temporary service. As discussed above, the cities have concerns about existing approaches that use current technologies in that they believe them to be inherently unsafe.

Moreover, for both the builder and the electric utility company, preferred embodiments simplify crew scheduling and coordination as well as simplify records and paperwork, which reduces costs and saves money for the electric utility company, the builder, and, ultimately, the consumer. Preferred embodiments are light colored and are more visible by construction workmen. And, because preferred embodiments use less components, preferred embodiments are cheaper to repair and maintain. In addition, preferred embodiments are tamper resistant and protect electrical sockets and electrical breakers. In particular, since the face mounted plate is secured in the temporary service box with tamper resistance hardware, the contractors are forced to maintain their equipment better. Previously, with conventional temporary service boxes if the GFCI (Ground Fault Circuit Interrupter) would open when the contractor tried to use improperly grounded equipment or faulted equipment the contractor would simply go into the service box and wire around the GFCI creating a hazardous situation. Also, preferred embodiments have larger cover openings which will allow the box to be closed and locked/sealed while the box is being used.

Other advantages of the invention and/or inventions described herein will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIG. 6A illustrates a cross-sectional diagram of a stand alone unit 600 in relation to ground level 650 that has pole 610, a plurality of first housings 605 positioned on various sides of pole 610, buried flexible conduit 620, hand hole 630 having a plurality of electrical connectors 635 therein, padmounted transformer 631 having a plurality of electrical connectors 637, and electrical cable 640 extending through buried flexible conduit 620 to either padmounted transformer 631 or to hand hole 630 and through pole 610 to electrical sockets and electrical breakers (not shown) inside first housing 605;

FIG. 6B illustrates an enhanced, cross-sectional diagram of the top portion 609 of stand alone unit 600 having pole 610, at least one first housing 605 on various sides of pole 610;

FIG. 8A illustrates a top view of lid (or second housing) 820 which has been specially designed to hold at least one first housing 805 having electrical sockets and electrical breakers which are electrically connected to connectors 835 via electrical cable 807;

FIG. 8B illustrates a cross-sectional view of hand hole 830 in relation to ground level 850 in which cover or lid (or second housing) 820 has been specially designed to hold at least one first housing 805 having electrical sockets and electrical breakers therein which are electrically connected to connectors 835 via electrical cable 807, and in which hand hole 830 has buried conduit 860 entering hand hole 830 with electrical cable 840 placed therein;

FIG. 8C illustrates a cross-sectional view of the gripping mechanism 808 used to secure electrical cable 807 together along with a top level view of a portion of cover or lid (or second housing) 820 and first housing 805;

DETAILED DESCRIPTION OF THE PREFERRED EMBODIMENT

Figure 1A:
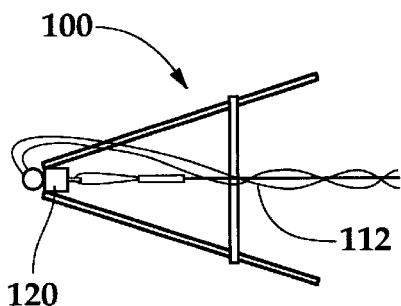
FIGS. 1A and 1B show side and top cross-sectional views of a temporary service pole 100 having an overhead secondary electrical connection 112.

The present inventions will be described by referring to apparatus and methods showing various examples of how the inventions can be made and used. When possible, like reference characters are used throughout the several views of the drawing to indicate like or corresponding parts.

As discussed in pending U.S. patent application entitled "Retrievable and Reusable Apparatus and Related Systems and Methods that interface to Facilities and Equipment that provide Electric Utilities to Construction Sites which can be activated by non-utility qualified individuals" having U.S. Ser. No. 08/591,255, which is herein incorporated by reference, residential neighborhoods are developed in any one of a variety of ways. Some neighborhoods have alleys, whereas other neighborhoods do not. Some neighborhoods bring in electrical service from the front, whereas other neighborhoods bring in electrical service from the rear. Consequently, it is important for all electrical equipment that is used to provide electrical facilities to neighborhoods be flexible, so as to conform and to meet the needs of each residential development.

FIGS. 2, 3, 4, and 5 show typical arrangements of residential neighborhoods and facilities needed to provide electrical utility services to each planned or existing dwelling (e.g., a house) on each lot. Electric service in an underground system is generally provided using the following methods and apparatus: (1) directly from a transformer secondary compartment; and (2) indirectly from a subsurface enclosure commonly referred to as a "hand hole" that is primarily a subground structure or a pedestal that is primarily an above-ground structure.

Figure 2:
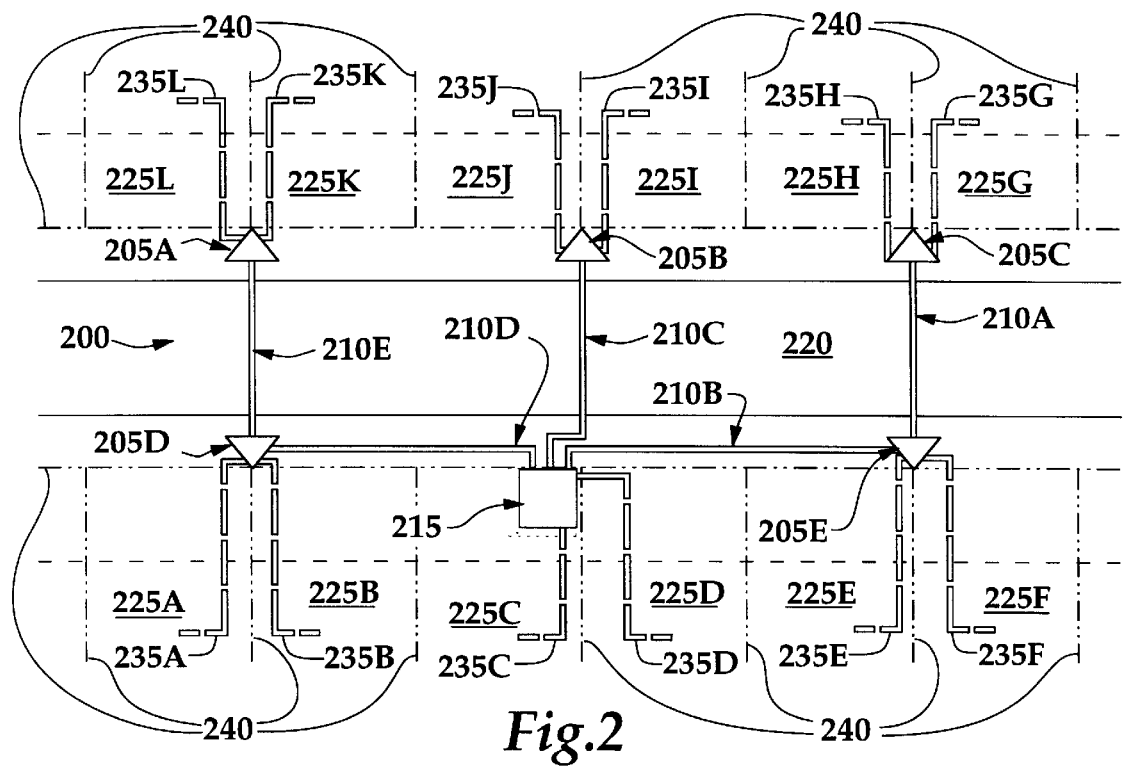
FIG. 2 illustrates typical front-lot arrangement 200 showing the corresponding arrangement of secondary power lines 210A–210E, hand hole or pedestal power supplies 205A–205E, padmounted transformer 215, street 220, the individual power lines 235A–235L to each planned or existing dwelling on each lot 225A–225L outlined by the property lines 240.
Figure 3:
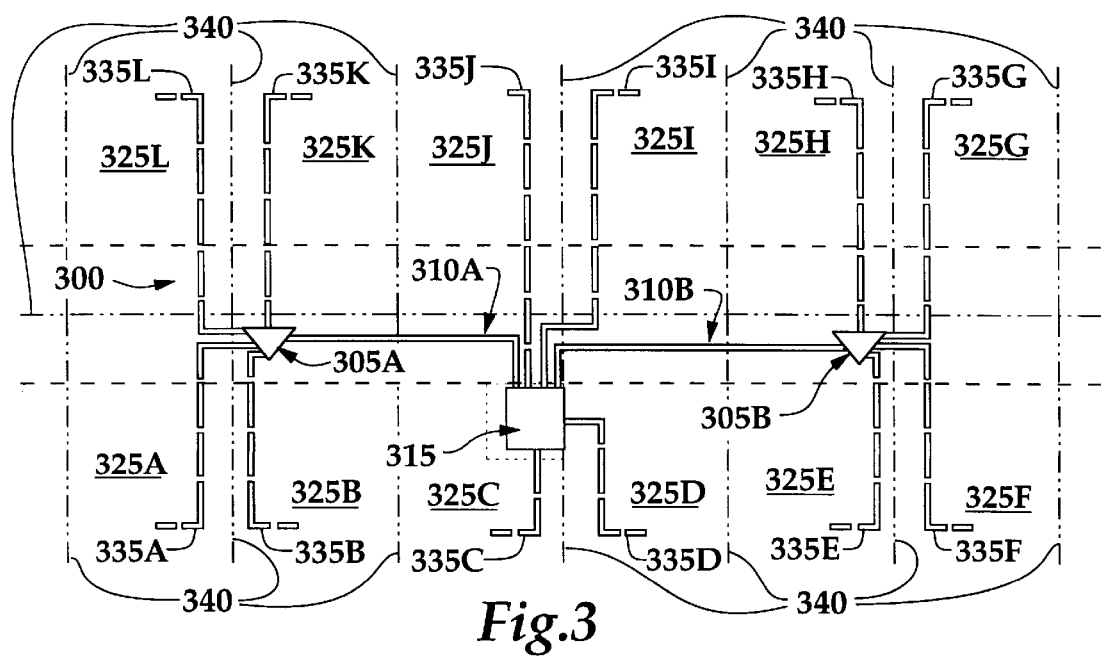
FIG. 3 illustrates typical rear-lot easement arrangement 300 showing the corresponding arrangement of secondary power lines 310A–310B, hand hole or pedestal power supplies 305A–305B, padmounted transformer 315, the individual power lines 335A–335L to each planned or existing dwelling on each lot 325A–325L outlined by the property lines 340.
Figure 4:
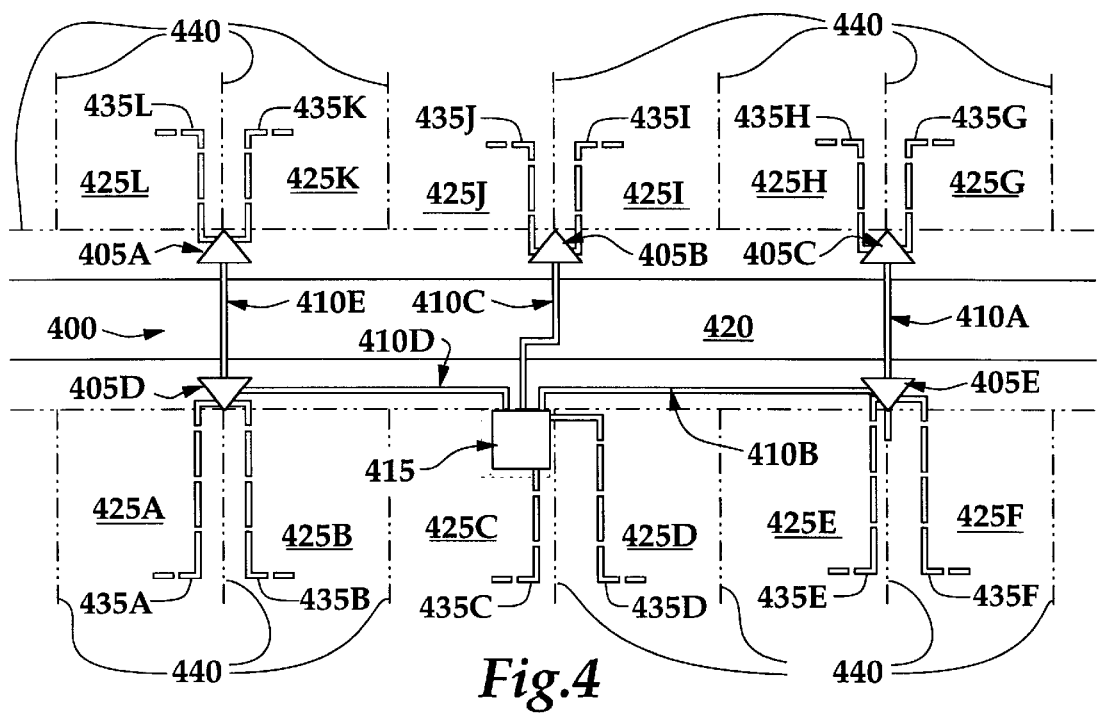
FIG. 4 illustrates typical rear-lot paved alley arrangement 400 showing the corresponding arrangement of secondary power lines 410A–410E, hand hole or pedestal power supplies 405A–405E, padmounted transformer 415, paved alley 420, individual power lines 435A–435L to each planned or existing dwelling on each lot 425A–425L, outlined by the property lines 440.
Figure 5:
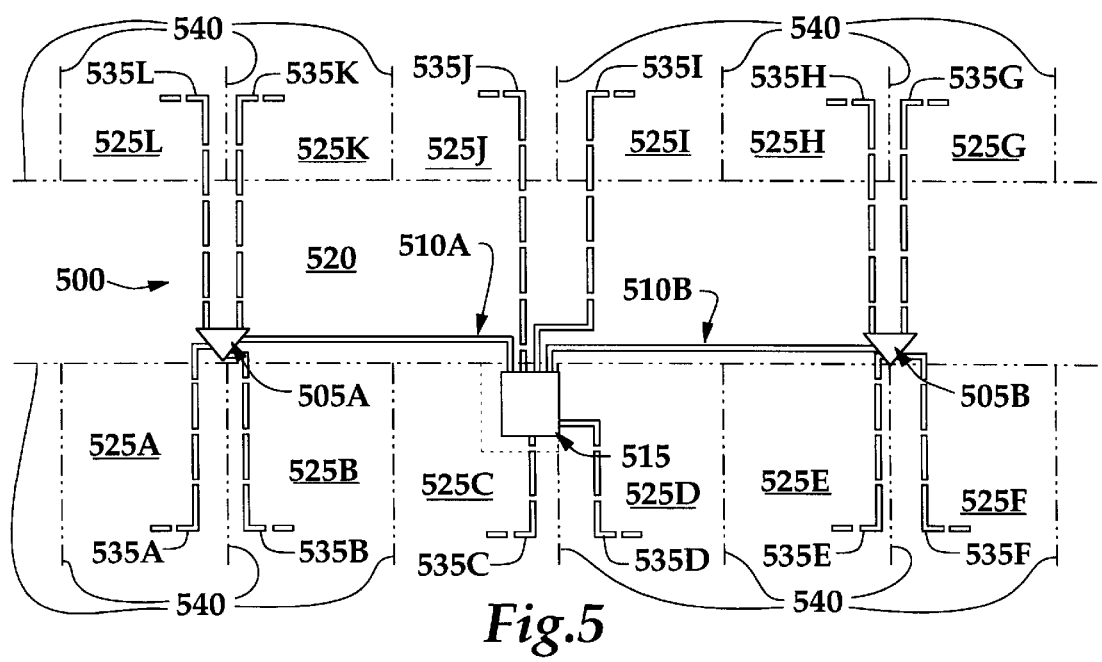
FIG. 5 illustrates typical rear-lot unpaved alley arrangement 500 showing the corresponding arrangement of secondary power lines 510A–510B, hand hole or pedestal power supplies 505A–505B, padmounted transformer 515, unpaved alley 520, the individual power lines 535A–535L to each planned or existing dwelling on each lot 525A–525L, outlined by the property lines 540.

Examples of transformer secondary compartments are padmounted transformers, which are shown as a square as padmounted transformer 215 in FIG. 2, padmounted transformer 315 in FIG. 3, padmounted transformer 415 in FIG. 4, or padmounted transformer 515 in FIG. 5. Likewise, examples of subsurface enclosures are hand hole or pedestal power supplies, which are shown as a triangle as hand hole or pedestal power supplies 205A–205E in FIG. 2, hand hole or pedestal power supplies 305A–305B in FIG. 3, hand hole or pedestal power supples 405A–405E in FIG. 4, or hand hole or pedestal power supplies 505A–505B in FIG. 5.

Note, in FIGS. 2–5, power lines electrically connecting the transformer, as referenced above, to an enclosure, as referenced above, are shown as a solid line from enclosure to enclosure and are referred to as secondaries or secondary power lines (e.g., secondaries or secondary power lines 210A–210E in FIG. 2, secondaries or secondary power lines 310A–310B in FIG. 3, secondaries or secondary power lines 410A–410E in FIG. 4, and secondaries or secondary power lines 510A–510B in FIG. 5). The service portion of the system of the power line leaves the transformer and/or enclosure to satisfy the energy needs of customers (including builders) and is shown by broken lines in FIGS. 2–5 (e.g., individual dwelling power lines 235A–235L in FIG. 2, individual dwelling power lines 335A–335L in FIG. 3, individual dwelling power lines 435A–435L in FIG. 4, and individual dwelling power lines 535A–535L in FIG. 5). The secondary power lines and service power lines are hardwired systems requiring cables and connectors. Cables and connectors are generally designed for bulk energy applications in the range of 75 to 420 amperes. The services are sized for a single customer and the secondaries for multiple customers. The enclosures and transformers are preferably tamper resistant and are designed to prevent entry by unauthorized individuals (e.g., children).

More specifically, FIG. 2 illustrates typical front-lot arrangement 200 showing the corresponding arrangement of secondary power lines 210A–210E, hand hole or pedestal power supplies 205A–205E, padmounted transformer 215, street 220, the individual dwelling power lines 235 to each planned or existing dwelling on each lot 225A–225L, outlined by the property lines 240. Note the position of street 220 in relation to lots 225A–225L. Each hand hole or pedestal power supplies 205A–205E provide electrical service to dwellings when constructed on two lots via individual power lines 235A–235L, which are generally buried. Hand hole or pedestal power supplies 205A–205E fan out from padmounted transformer 215 in small groups. In particular, hand hole or pedestal power supplies 205A and 205D are electrically connected together via secondary power line 210E and to padmounted transformer 215 via secondary power line 210D. Similarly, hand hole or pedestal power supply 205B is electrically connected to padmounted transformer 215 via secondary power line 210C. Hand hole or pedestal power supples 205C and 205E are electrically connected together via secondary power line 210A and to padmounted transformer 215 via secondary power line 210B.

FIG. 3 illustrates typical rear-lot easement arrangement 300 showing the corresponding arrangement of secondary power lines 310A–310B, hand hole or pedestal power supplies 305A–305B, padmounted transformer 315, the individual dwelling power lines 335A–335L to each planned or existing dwelling on each lot 325A–325L, outlined by the property lines 340. Note the position of arrangement of lots 325A–325L adjacent to one another and the absence of street or alley. Each hand hole or pedestal power supplies 305A–305B provide electrical service to dwellings when constructed (not shown) on four lots via individual power lines 335, which are buried. Hand hole or pedestal power supplies 305A–305B fan out from padmounted transformer 315 in small groups. In addition, individual power lines 335A–335L also fan out directly from padmounted transformer 315. In particular, hand hole or pedestal power supply 305A is electrically connected to padmounted transformer 315 via secondary power line 310A. Similarly, hand hole or pedestal power supply 305B is electrically connected to padmounted transformer 315 via secondary power line 310B.

FIG. 4 illustrates typical rear-lot paved alley arrangement 400 showing the corresponding arrangement of secondary power lines 410A–410E, hand hole or pedestal power supplies 405A–405E, padmounted transformer 415, paved alley 420, the individual dwelling power lines 435A–435L to each dwelling on each lot 425A–425L, outlined by the property lines 440. Note the position of paved alley 420 in relation to lots 425A–425L. Each hand hole or pedestal power supplies 405A–405E each provide electrical service to dwellings (not shown) on two lots via individual power lines 435A–435L, which are buried. Hand hole or pedestal power supplies 405A–405E fan out from padmounted transformer 415 in small groups. In particular, hand hole or pedestal power supplies 405A and 405D are electrically connected together via secondary power line 410E and to padmounted transformer 415 via secondary power line 410D. Similarly, hand hole or pedestal power supply 405B is electrically connected to padmounted transformer 415 via secondary power line 410C. Hand hole or pedestal power supples 405C and 405E are electrically connected together via secondary power line 410A and to padmounted transformer 415 via secondary power line 410B.

FIG. 5 illustrates typical rear-lot unpaved alley arrangement 500 showing the corresponding arrangement of secondary power lines 510A–510B, hand hole or pedestal power supplies 505A–505B, padmounted transformer 515, unpaved alley 520, the individual dwelling power lines 535A–535L to each planned or existing dwelling on each lot, outlined by the property lines 540. Note the position of arrangement of lots 525A–525L adjacent to one another in relation to the unpaved alley 520. Hand hole or pedestal power supplies 505A–505B each provide electrical service to dwellings when constructed (not shown) on four lots via individual power lines 535, which are buried. Hand hole or pedestal power supplies 505A–505B fan out from padmounted transformer 515 in small groups. In addition, individual power lines 535A–535L also fan out directly from padmounted transformer 515. In particular, hand hole or pedestal power supply 505A is electrically connected to padmounted transformer 515 via secondary power line 510A. Similarly, hand hole or pedestal power supply 505B is electrically connected to padmounted transformer 515 via secondary power line 510B.

Electrical utility services are generally broken up into two distinct types of service: (1) the construction service and (2) the permanent service. The construction service is generally viewed as a temporary electric utility service that supplies the energy needed to construct the permanent structure and facilities. The energy needs for construction service are usually significantly less than the energy needs required for the permanent service. Nevertheless, there are differences in the needs and characteristics of temporary electric facilities and permanent electrical facilities. Facilities providing permanent service are sized to meet the energy needs of the occupant of the structure and facility and remain in place after the facilities used to provide temporary electric utility service are removed. Consequently, preferred embodiments have been designed such that it can be used to provide construction service quickly, readily, and cheaply, but also easily converted to provide permanent service by modifying existing equipment, removing existing equipment, and adding additional equipment. By comparison, facilities providing temporary service must be sized to meet the energy needs of the builder when the builder needs the service. In addition, facilities providing temporary service must be easily installed and removed and preferably do not substantially affect the permanent electrical equipment or otherwise require the permanent electrical equipment to be substantially modified.

Figure 9A:
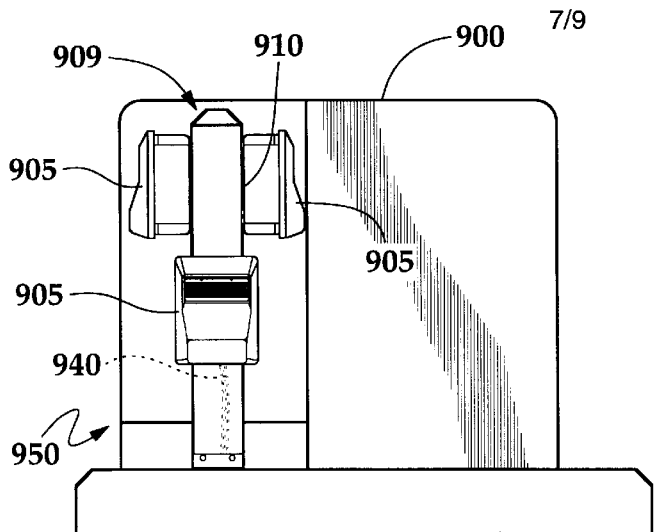
FIGS. 9A and 9B illustrate cross-sectional views from different angles of an add-on interface unit 950 for a transformer 900 on pad 901 in which transformer 900 is electrically connected to at least one first housing 905 with electrical sockets and electrical breakers via cable 940 enclosed in pole 910 and joint 912 and stabilizer 932 to stabilize pole 910.
Figure 9C:
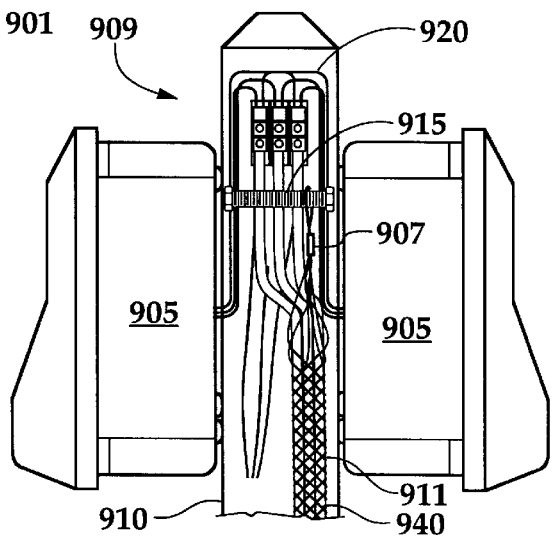
FIG. 9C illustrates a cross-sectional view of enhanced portion 909 of add-on interface unit 950.
Figure 9B:
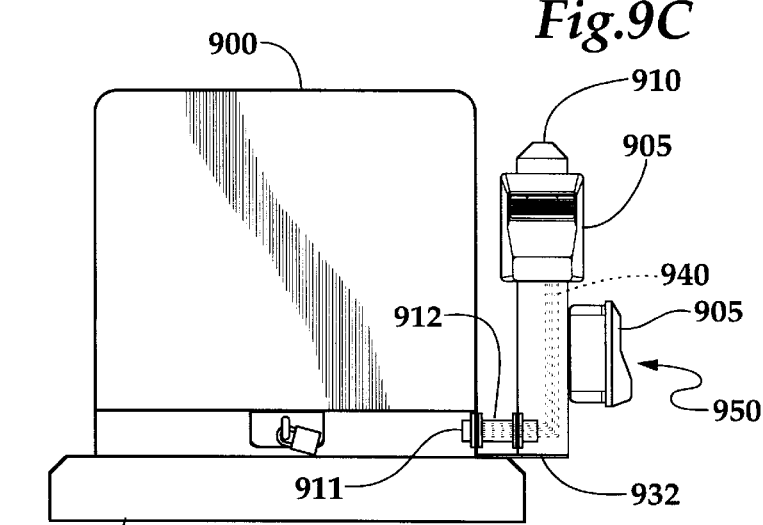
Figure 11:
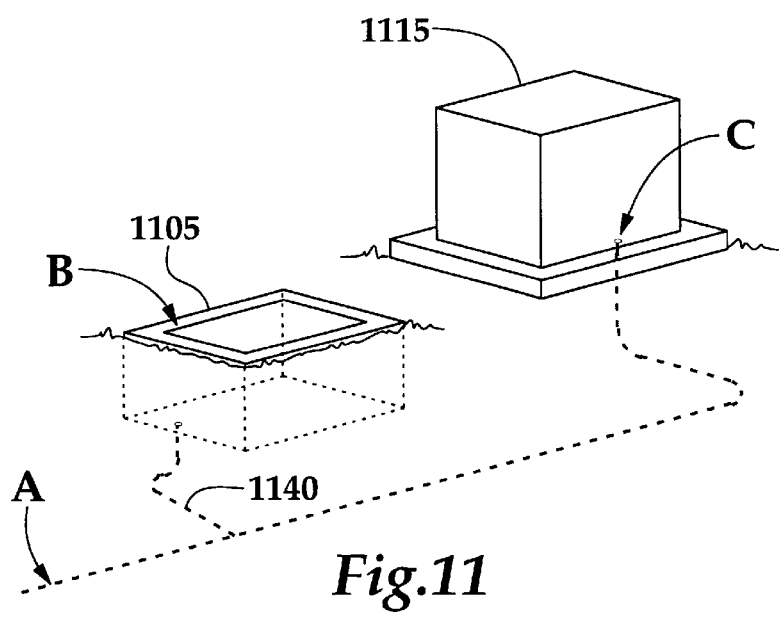
FIG. 11 illustrates a the relative placement of the stand alone unit 600 (denoted by letter "A") shown in FIGS. 6A and 6B, modified hand hole cover 820 (denoted by letter "B") shown in FIGS. 8A, 8B and 8C, or add-on unit 950 (denoted by letter "C") shown in FIGS. 9A, 9B and 9C.
Figure 12A:
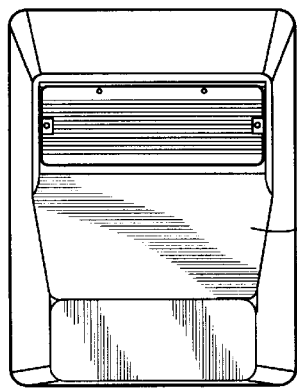
FIGS. 12A–12D show detailed views of the preferred embodiment of first housing 605 (in FIGS. 6A and 6B), first housing 705 (in FIGS. 7A and 7B), first housing 805 (in FIGS. 8A, 8B and 8C) and first housing 905 (in FIGS. 9A, 9B and 9C).
Figure 12B:
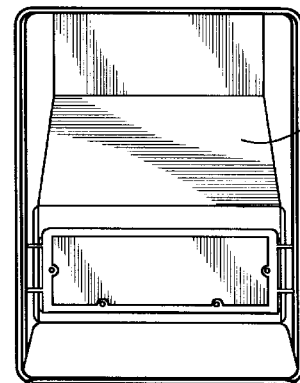
Figure 12C:
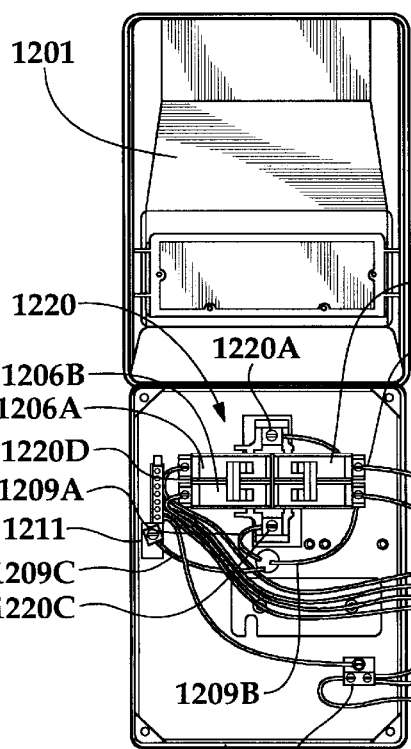
Figure 12D:
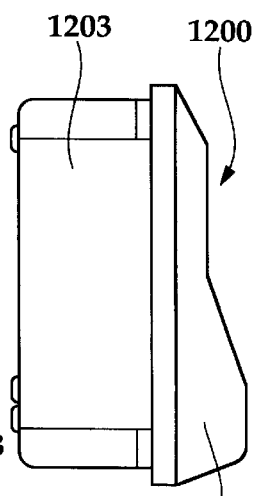

FIG. 11 illustrates the relative placement of the stand-alone unit 600 (denoted by letter "A") shown in FIGS. 6A and 6B, or modified hand hole cover 820 (denoted by letter "B") shown in FIGS. 8A, 8B, and 8C, or add-on transformer interface unit 950 (denoted by letter "C") shown in FIGS. 9A, 9B, and 9C. Stand-alone unit 600 and/or hand hole 1105 is (are) electrically connected to transformer 1115 (via cable(s) 1140). The electric utility's permanent equipment and secondary circuits (e.g., transformer 1115 and hand hole (or pedestal) 1105 and necessary cables) are generally installed during the early stages of property development. FIGS. 6A–6B, 7A–7B, 8A–8C, 9A–9C, and 12A–12D illustrate a number of alternative preferred embodiments that will be described below in relation to FIG. 11.

Figure 1B:
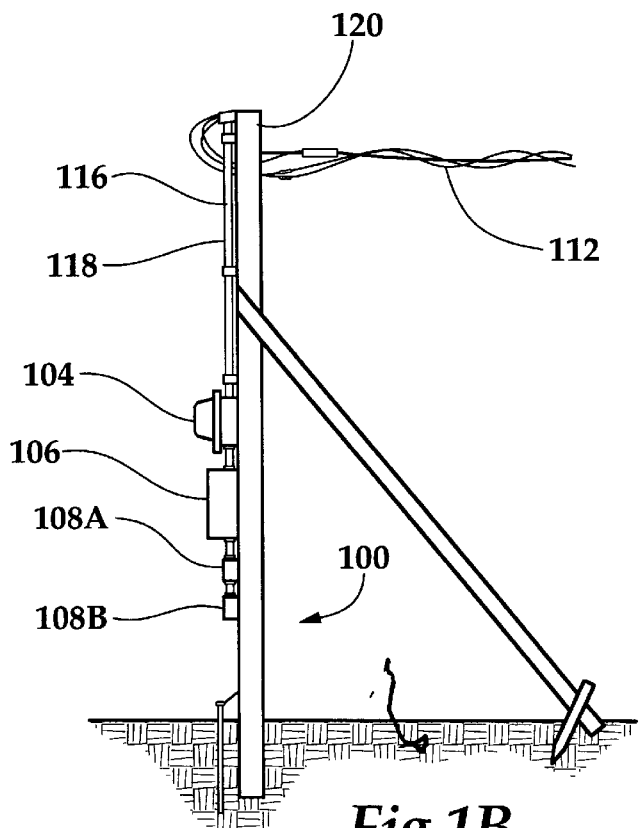
Figure 1C:
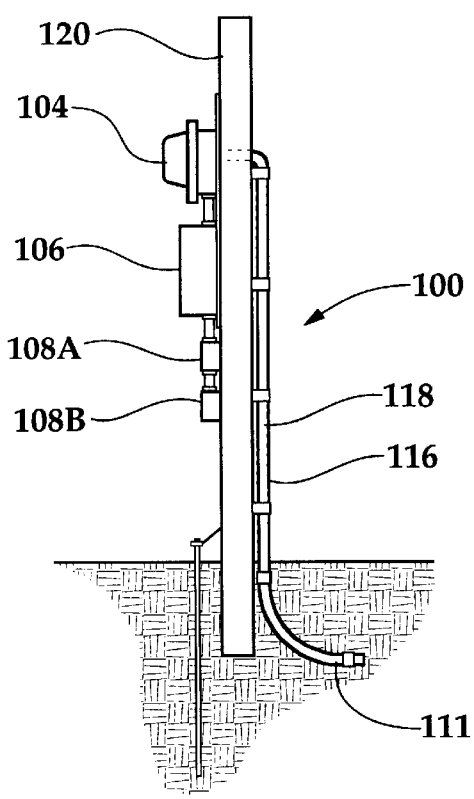
FIG. 1C shows a cross-sectional view of a temporary service pole 100 having underground secondary electrical connection 111.
Figure 1D:
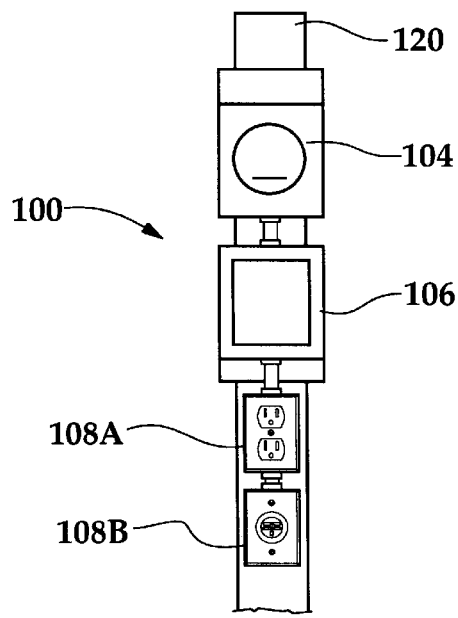
FIG. 1D shows a frontal view of temporary service pole 100, showing meter base 104, breaker box 106, pole 120, and plug boxes 108A and 108B.

FIG. 6A illustrates a cross-sectional diagram of a stand alone unit 600 in relation to ground level 650 that has pole 610, a plurality of first housings 605 positioned on various (exterior) sides of pole 610, buried flexible conduit 620, hand hole 630 having a plurality of electrical connectors 635 and/or padmounted transformer 631 having electrical connectors 637 therein and electrical cable(s) 640 extending through buried flexible conduit 620 and through pole 610 to first housings 605 to selectively electrically connect connectors 635 and/or electrical connectors 637 to electrical components found in first housings 605. FIG. 6B illustrates an enhanced, cross-sectional diagram of the top portion 609 of stand alone unit 600 having pole 610 and a plurality of first housings 605 positioned on various sides of pole 610. The preferred embodiment shown in FIGS. 6A and 6B is installed as a stand alone unit 600 at position A (in FIG. 11) in close proximity to the electric utilities equipment and the construction site (e.g., hand hole 630 and/or transformer 631 in FIG. 6A and/or transformer 1115 and hand hole 1105 in FIG. 11). While FIG. 6A shows the stand alone unit 600 being used with a hand hole 630, it can also be used with a padmounted transformer 631 (or pedestal) or padmounted transformer 1115 in FIG. 11. Stand alone unit 600 utilizes flexible conduit 620, which is generally buried, to house electrical cables 640 to serve as the interface utility connection wiring. Of course, electrical cables 640 may also be positioned overhead, as in FIGS. 1A and 1B. Conduit 620 is flexible corrugated type conduit and extends from the stand alone unit 600 to hand hole 630 or to padmounted transformer 631. Conduit 620 allows the interface and wiring to be easily retrieved as well as installed and reused without having to dig up electrical cable 640 (along with conduit 620).

In addition, note that pole 610 is hollow and also holds electrical cables 640 (and a portion of conduit 620) therein, which effectively isolates electrical cables 640 from the environment to reduce environmental wear and tear on electrical cables 640 and to minimize the dangers associated with electricity (e.g., it is harder for children and workers to get access to and to damage the electrical cables 640, especially when buried, and encased in conduit 620, and positioned inside pole 610). The exposed portion of pole 610 can be sealed to add even more protection. The use of pole 610 also makes the electrical cables 640 retrievable without digging up all of electrical cables 640. Note the preferred embodiment shown in FIG. 6A has slot 607 cut at the bottom edge of pole 610. The width of slot 607 is cut slightly smaller than the groove diameter of the conduit and extends about twice the diameter of the conduit up the base of pole 610. Slot 607 allows conduit 620 to slide up slot 607 to secure it to pole 610. When pole 610 is restrained, it is pulled out of the ground and conduit 620 slides out of slot 607 of pole 610 and remains in the ground. The interconnecting wiring contained within conduit 620 and pole 610 will slide through conduit 620 and remain attached to first housing 605, but within pole 610.

As shown in FIG. 6B, electrical cables 640 are preferably held together as a single unit with gripping element 611, which has an attachment mechanism 607 (e.g., a hook or loop) that attaches electrical cables 640 to rod 615. Each end of rod 615 is attached to an interior surface of pole 610 to secure rod 615 in place (along with electrical cables 640). Alternatively, rod 615 may actually extend through the interior and exterior surfaces of pole 610. This configuration also produces some slack in electrical cables 640, which makes the overall configuration easier to work with. Distribution block 620 receives electrical cables 640 and then distributes energy via additional electrical cables 621 to electrical components in each first housing 605. Distribution block 620 employs a screw contact system similar to that shown as screw contact system 1220 in FIG. 12C and discussed in the text corresponding to FIG. 12C.

The installation procedure for the preferred embodiment shown in FIG. 6A comprises the following steps: (a) locating and positioning stand alone unit 600 close to hand hole, pedestal or padmounted transformer, such as hand hole 630 or padmounted transformer 631 in FIG. 6A or hand hole 1105 or padmounted transformer 1115 in FIG. 11; (b) digging a hole in which to place the bottom portion of pole 610 and digging a trench for conduit 620 to hand hole 630) and/or to pedestal or padmounted transformer 631; (c) setting pole 610 in a hole and laying in conduit 620 housing cables 640 to hand hole 630 or to padmounted transformer 631; (d) backing in and/or filing-in dirt around the base of stand alone unit 600 and the trench and tamping it in; and (e) connecting and interconnecting electrical cables 640 to stand alone unit 600 to interconnect stand alone unit 600 to the power system. The removal procedures for stand alone unit 600 are generally comprised of the following steps: (a) disconnecting electrical cables 640 from hand hole connectors 635 or padmounted transformer connectors 637, and (b) pulling stand alone unit 600 out of the ground. Conduit 620 Will automatically disconnect itself from stand alone unit 600 and electrical cables 640 will slide through conduit 620 and remain attached to the stand alone unit 600.

FIGS. 9A and 9B illustrate cross-sectional views from different angles of an add-on interface unit 950 for a transformer 900 on pad 901 in which transformer 900 is electrically connected to electrical components in first housing 905 via cable 940 enclosed in pole 910 and joint 912 with stabilizer 932 to stabilize pole 910. FIG. 9C illustrates a cross-sectional view of enhanced portion 909 of add-on interface unit 950. Add-on interface unit 950 utilizes the construction/temporary service entrance port 911 on the transformer's cabinet sill. Electrical cables 940 extend outward from the circuitry embedded in transformer 900 via joint 912 into pole 910, which is hollow and non-conductive. Pole 910 and joint 912 houses electrical cables 940, which effectively isolates electrical cables 940 from the environment to reduce environmental wear and tear on electrical cables 940 and to minimize the dangers associated with electricity. First housings 905 are placed on an exterior surface of pole 910 and electrical components therein are electrically connected to electrical cable 940. Stabilizer 932 extends outward under joint 912 and underneath pole 950 and is also secured under transformer 900. Pole 950 rests on stabilizer 932. Add-on interface unit 950 is preferably placed at position C in FIG. 11.

Once again, as shown in FIG. 9C, electrical cables 940 are preferably held together as a single unit with gripping element 911, which has an attachment mechanism 907 (e.g., a hook or loop) that attaches electrical cables 940 to rod 915. Each end of rod 915 is attached to an interior surface of pole 910 to secure rod 915 in place (along with electrical cables 940). Once again, alternately, rod 915 may extend through interior and exterior surfaces of pole 910. This configuration also produces some slack in electrical cables 940, which makes the overall configuration easier to work with. Distribution block 920 receives electrical cables 940 and then distributes energy via additional electrical cables 921 to electrical components in each housing 905. Distribution block 920 is shown in greater detail in FIG. 9C and employs a screw contact system similar to that shown as screw contact system 1220 in FIG. 12C and discussed in the text corresponding to FIG. 12C.

Referring again to FIG. 9B, the installation procedures comprise the following steps of (a) inserting the interface unit's (add-on unit's 950) interconnecting wiring (electrical cables 940) through the construction/temporary services entrance port on the transformer cabinet sill; (b) lining the interconnecting wiring pipe (joint 912) up to the port and sliding the pole stabilizer plate 932 under the sill and seat the pipe (joint 912) in the port and secure it to the transformer 900 with provided hardware; (c) placing pole 910 having first housing(s) 905 positioned on an exterior surface of the pole 910 (add-on unit 950) on the pole stabilizer plate 932 (or directly placing pole 910 with first housing(s) 905 directly on pad 901) and electrical components in housing 905 connected to cable 940; and (d) connecting the interconnecting wiring (electrical cables 940) to the transformer's secondary connectors. Removal procedures are generally comprised of the following steps of (a) disconnecting the interconnecting wiring (cable 940) from the transformer's secondary connectors; (b) disconnecting the securing hardware holding the interconnecting wiring pipe to the transformer; (c) sliding the add-on unit 950 away from the transformer 900 (along with pole stabilizer plate 932); and (d) securing the transformer's construction/temporary secondary service port by bolting a closing plate over the opening.

Figures 7A, 7B:
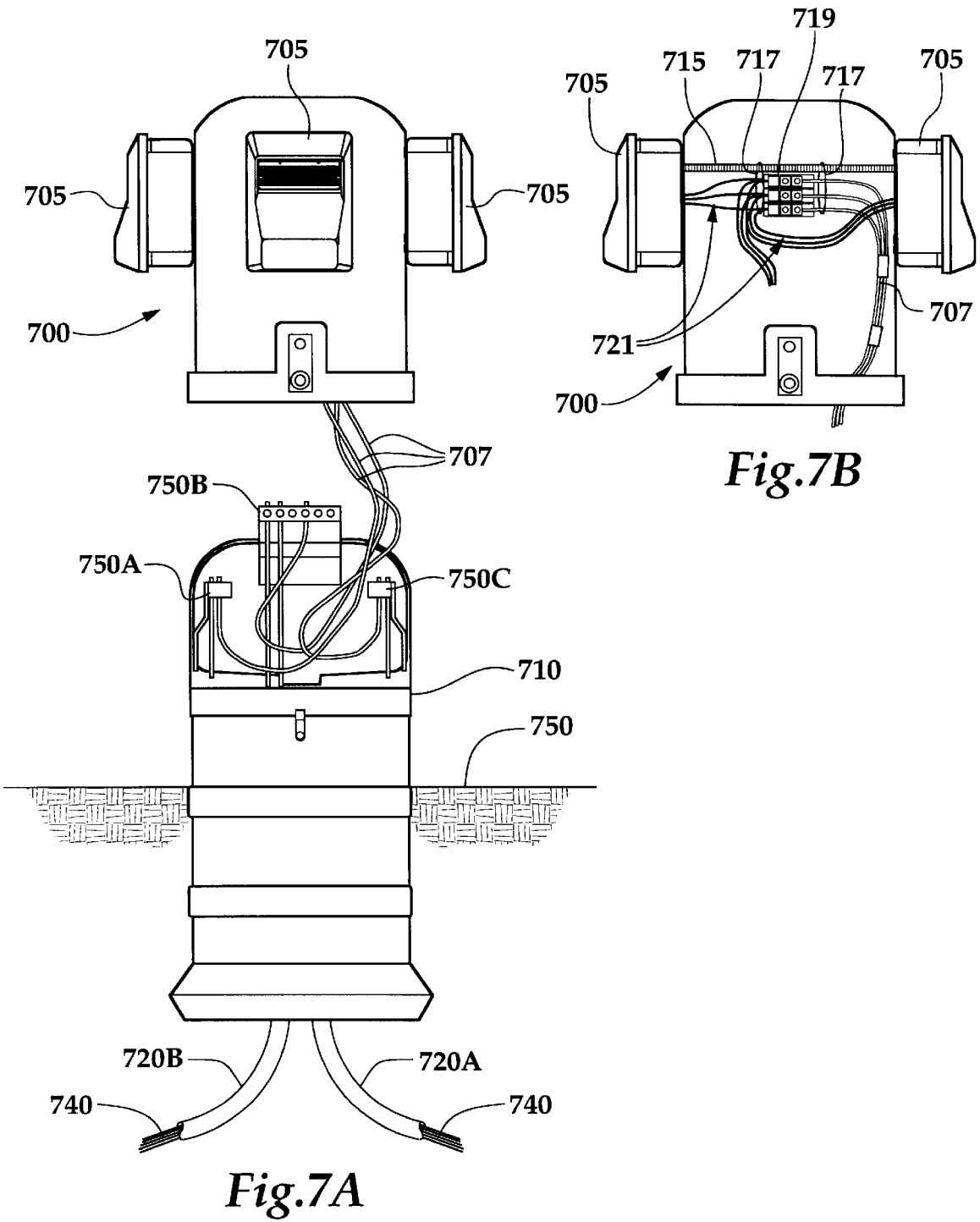
FIGS. 7A and 7B illustrates a modification to pedestal cover or second housing 700 and pedestal base 710 in relation to ground level 750 in which pedestal cover (or second housing 700) 700 has at least one first housing 705 positioned on exterior surface of second housing with electrical sockets and electrical breakers (not shown) in first housing 705 that are connected to electrical cables 707 and to electrical cables 740 which are placed in buried conduit 720A–720B.

FIGS. 7A and 7B illustrates a modification to pedestal cover of lid (or second housing) 700 and pedestal base 710 in relation to ground level 750 in which pedestal cover or lid (or second housing) 700 has a plurality of first housings 705 positioned on exterior surface which are electrically connected to connectors 750A, 750B, and 750C in pedestal base 710 via electrical cables 707 and to electrical cables 740 which are placed in buried conduit 720A–720B. Pedestal cover 700 and pedestal base 710 combine to make second housing 700 fully enclosed and sealed. The pedestal's cover or lid 700 is preferably of sufficient size and is comprised of non-conductive (e.g., non-metallic and non-conductive) material and the pedestal cover or lid 700 is a separable and replaceable item. In this preferred embodiment, first housings 705 are placed on an exterior surface (or another accessible surface or position) of pedestal cover or lid 700 and are electrically connected to electrical cable 740 via wiring 740 and electrical connectors 750A, 750B and 750C. As noted above, electrical cable 740 in conduits 720A and 720B electrically connects electrical connectors 750A, 750B and 750C to other electrical utility facilities (e.g., transformer 1115 in FIG. 11).

The preferred embodiment shown in FIGS. 7A and 7B actually replace typical pedestals used in position B (where hand hole 1105 is placed) in FIG. 11 during the time period that temporary power is needed. Also, note referring to FIG. 7B, electrical cables 707 are taped together and secured in place with an attachment mechanism 717 (e.g., hook or loop) that attaches the electrical cables 707 to rod 715. Once again, each end of rod 715 is secured to an interior surface of pedestal cover 700 to secure rod 715 in place (along with electrical cables 707). Distribution block 719 receives electrical cables 707 and distributes energy via additional electrical cables 721 to electrical components in first housings 705. Distribution block 719 employs a screw contact system similar to that shown as screw contact system 1220 in FIG. 12C and discussed in the text corresponding to FIG. 12C. Once again, loops 717 secure cables 707 and 721 to rod 715.

Referring again to FIG. 7A, the installation procedures are generally comprised of the following steps (a) removing the existing pedestal cover; (b) connecting the pedestal interface unit's interconnecting wiring (wiring 707) to the pedestal base connectors 750A, 750B, and 750C; and (c) sliding on pedestal cover 700 and securing pedestal cover 700 with hardware. The removal procedures generally comprise the following steps: (a) unbolting and sliding off the pedestal cover 700 and (b) disconnecting the pedestal cover interconnecting wiring (wiring 707) from the pedestal base connectors 750A, 750B, and 750C; and (c) installing standard pedestal cover on pedestal base.

FIG. 8A illustrates a top view of lid (or second housing) 820 which has been specially designed to hold at least one first housing 805 having electrical components that are electrically connected to electrical connectors 835 via electrical cable 807. Similarly, FIG. 8B illustrates a cross-sectional view of hand hole 830 in relation to ground level 850 in which cover or lid (or second housing) 820 has been specially designed to hold at least one first housing 805 having electrical components that are electrically connected to electrical connectors 835 via electrical cable 807, and in which hand hole 830 has buried conduit 860 entering hand hole 830 with electrical cable 840 placed therein. And, FIG. 8C illustrates a cross-sectional view of the gripping mechanism 808 used to secure electrical cable 807 together along with a top level view of a portion of lid 820. Note lid 820 would be placed over hand hole 1105 at position B shown in FIG. 11.

Also, note lid 820 forms a second housing, which is sealed when placed over the hand hole 830. Electrical cable 840 in conduit 860 electrically connect electrical connectors 835 to other electrical utility facilities (e.g., transformer 1115 in FIG. 11). Electrical connectors 835 are also electrically connected to electrical wiring 807 that electrically connect to components in first housing 805. Referring to FIG. 8C, electrical cables 807 are secured in place with an gripping mechanism 808 (e.g., hook or loop) that secures electrical cables 807 to rod 815. Each end of rod 815 is secured to an interior surface of lid 820 to secure rod 815 in place (along with electrical cables 807). Distribution block 819 is also secured to rod 815. Distribution block 819 receives electrical cables 807 (not shown) and distributes energy via additional electrical cables 809 to electrical components in first housing 805.

Referring again to FIG. 8B, the installation procedures are as follows: (a) removing existing hand hole lid; (b) connecting interface housing unit interconnecting wiring (electrical cables 807) to connectors 835 in hand hole 830; and (c) sliding housing unit (lid 820) into the lid mounting area on hand hole 830 and securing housing unit (lid 820) with hardware (e.g., screws 811). The removal procedures are as follows: (a) unbolting and sliding off interface housing unit (lid 820); (b) disconnecting the interface housing unit's interconnecting wiring from the connectors 835 in hand hole 830; and (c) installing standard hand hole lid on the hand hole 830.

Figure 10:
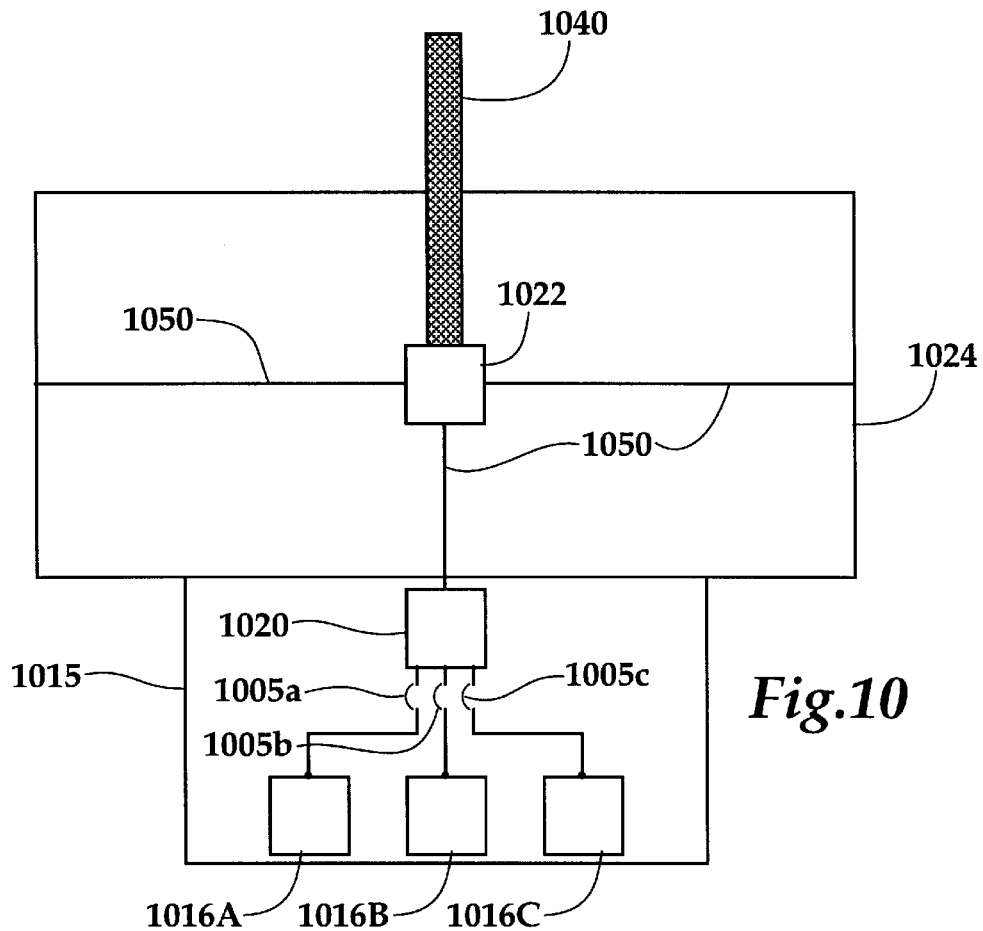
FIG. 10 illustrates a simplified wiring diagram of utility connecting cable 1040 (which is similar to that cable 640 in FIGS. 6A and 6B, cable 740 in FIGS. 7A and 7B, cable 840 in FIGS. 8A, 8B, and 8C, cable 940 in FIGS. 9A, 9B, and 9C), a first distribution block 1020 (enclosed in first housing 1015), a second distribution block 1022 (enclosed in second housing 1024), a plurality of circuit breakers 1005 and electrical sockets 1016A, 1016B, and 1016C in first housing 1015 and wiring 1050 extending from first distribution block 1020 to second distribution block 1022.

FIG. 10 illustrates a simplified wiring diagram of utility connecting cable 1040, (which is similar to that cable 640 in FIGS. 6A and 6B, cable 707 in FIGS. 7A and 7B, cable 807 in FIGS. 8A, 8B, and 8C, and cable 940 in FIGS. 9A, 9B, and 9C), first distribution block 1020 (enclosed in interface housing 1015 similar to first housing 605 in FIGS. 6A and 6B, first housing 705 in FIGS. 7A and 7B, first housing 805 in FIGS. 8A, 8B, and 8C, and first housing 905 in FIGS. 9A, 9B, and 9C), a second distribution block 1022 (enclosed in second housing 1024), and a plurality of breakers 1005a, 1105b and 1105c and electrical sockets 1016A, 1016B, and 1016C, which are selectively electrically connected to first distribution block 1020 and to second distribution block 1022 via internal electrical wires 1050 and breakers 1005a, 1005b and 1005c. Note first distribution block 1020 is secured in place by tape, an adhesive, or screws, such as shown in FIGS. 6A–6B, 7A–7B, 8A–8C, and 9A–9C, wherein second distribution block 1024 is secured in place with a support, bracket, bracelet, or to a rod. Alternatively, an attachment mechanism, such as a cable grip, can be used to secure the cables going out of second distribution block 1022 in order to stabilize second distribution block 1022. Electrical sockets 1016A and 1016B are preferably GFCI Duplex Outlets; Electrical socket 1016C is preferably a 240 V outlet. Breakers 1005a and 1005b are preferably 20A breakers; breaker 1005c is preferably a 30A breaker.

FIGS. 12A–12D show the preferred housings 1200 used as first housings 605 (in FIGS. 6A and 6B), 705 (in FIG. 7A and 7B), 805 (in FIGS. 8A, 8B, and 8C), and 905 (in FIGS. 9A, 9B, and 9C). First distribution block 1220 is attached to first housing 1203 and accepts ground wire 1209C that was separated from the electrical cable supplying power to the preferred embodiment (e.g., cable 640 in FIG. 6A and 6B, cable 740 AND 740 in FIGS. 7, cable 840 in FIG. 8B, cable 940 in FIGS. 9A, 9B, and 9C, cable 1040 in FIG. 10). Wires 1209A and 1209B energize screw terminals 1220A and 1220C. Breakers 1206A, 1206B, and 1206C selectively activate or energize plugs 1208A, 1208B, and 1208C. Specifically, breaker 1206A energizes plug 1208A; breaker 1206B energizes plug 1208B; and breaker 1206C energizes plug 1208C. Breaker 1206C is actually two individual breakers tied together. Wire 1209C is tied to ground at screw contact 1211 and ground wires extending from plugs 1208A, 1208B, and 1208C are tied to contact 1215. Lid 1205 encloses the wiring inside first housing 1200. First housing is preferably comprised of non-metallic, non-conductive material. Lid 1205 is preferably substantially flat and comprised of metallic (and conductive) material. Non-metallic material can also be used for lid 1205, but is not presently preferred due to the cost. Lid 1205 has a first surface 1207A and a second surface 1207B. When lid 1205 is positioned to enclose wiring in housing 1200, first surface 1207A is facing inward toward the interior of housing 1200 and second surface 1207B is facing outward. Lid 1205 also is comprised of a first opening 1219A and a second opening 1219B to permit breakers 1206A, 1206B, and 1206C to extend through when lid 1205 is positioned in place. Note lid 1205 is preferably grounded by grounding stud 1229. Normal grounding of the lid 1205 would be accomplished by using one of the plate mounting screws 1221A, 1221B, 1221C, and 1221D or one of the mounting screws for the plug or GFCI socket, but grounding stud 1229 assures a good ground on lid 1205, whereas the other grounding suggestions may be unreliable. Additional openings are also used to permit plugs 1208A, 1208B, and 1208C to extend through, so that extension cords and the like can be plugged therein. Lid 1205 is also secured with a plurality of tamper resistant screws 1221A, 1221B, 1221C, and 1221D through screw openings 1221A, 1221B, 1221C, and 1221D. Plugs 1208A, 1208B, and 1208C are actually screwed into or otherwise attached to lid 1205. Plugs 1208A and 1208B are preferably GFCI Duplex Outlets, whereas plug 1208C is a 240 V outlet. A second hinged lid 1201 is also used to cover lid 1205 having breakers 1206A, 1206B, 1206C, and 1206D and plugs 1208A, 1208B, and 1208C exposed through lid 1205. Second lid 1201 protects breakers 1206A, 1206B, 1206C, and 1206D and plugs 1208A, 1208B, and 1208C from the environment.

FURTHER MODIFICATIONS AND VARIATIONS

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, there can be numerous designs and variations on the interfacing housings all based on the fundamental concepts discussed above. There can also be numerous means and designs to allow the energizing and connecting of the construction/temporary service. Examples of alternate connecting elements would be plug-in, set screw terminal, spade/lug terminal, and screw terminals. Breakers could be both manual and electrically operated. Moreover, while the above discussion was primarily directed toward an underground system, the same concept would also apply to service from an overhead type system, even though the wiring and connecting elements may need to be modified in the above-ground systems. Note, while the above discussion generally described electrical connections as "connections," or being "connected," they may also be electrically coupled. Likewise, connectors can be couplers. And, although electrical components, first housings 605, 705, 805, and 905, plugs (or sockets) 1208A, 1208B, and 1208C, breakers 1206A, 1206B, and 1206C are often described in pluralities, alternate preferred embodiments may only use one such item.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed is:

1. An electrical interface, comprising:
   (a) permanent electrical facilities that provide electrical power; and
   (b) a temporary electrical facility electrically connected to said permanent electrical facilities, said temporary electrical facility provides electrical utilities to construction sites, said temporary electrical facility comprising
   (b1) a non-conductive housing;
   (b2) at least one electrical breaker;
   (b3) at least one electrical plug, said at least one electrical breaker and said at least one electrical plug positioned in and enclosed within said non-conductive housing in such a manner that said at least one electrical breaker and said at least one electrical plug can be accessed from a position exterior to said non-conductive housing, said at least one electrical breaker electrically coupled to said permanent electrical facilities and to said at least one electrical plug in such a manner to selectively switch power to and from said at least one electrical plug;
   (b4) a hollow pole having an exterior surface, said non-conductive housing is positioned on said exterior surface of said hollow pole, said hollow pole having a hollow cavity; and
   (b5) electrical wiring to electrically couple said at least one electrical breaker to said permanent electrical facilities, said electrical wiring extending from said at least one electrical breaker in said non-conductive housing to said permanent electrical facilities, said electrical wiring extending from at least one electrical breaker through said exterior surface of said hollow pole and into said hollow cavity of said hollow pole and through said hollow cavity of said hollow pole.

2. The electrical interface of claim 1, wherein said hollow pole is a light color.

3. The electrical interface of claim 1, wherein said temporary electrical facility is linked to said permanent electrical facilities via an underground cable extending from said temporary electrical facility to said permanent electrical facilities, said underground cable is encased in conduit until said underground cable enters said hollow cavity of said hollow pole and is electrically coupled to said electrical wiring.

4. The electrical interface of claim 1, wherein said temporary electrical facility is electrically coupled to said permanent electrical facilities via an overhead cable extending from said temporary electrical facility to said permanent electrical facilities, said overhead cable enters said hollow cavity of said hollow pole and is electrically coupled to said electrical wiring.

5. The electrical interface of claim 1, wherein said non-conductive housing, said at least one electrical breaker, and said at least one electrical plug form a single unit that is attached to said exterior surface of said hollow pole.

6. The electrical interface of claim 1, wherein said non-conductive housing is comprised of materials selected from a group consisting of fiberglass, assorted polymer technologies and plastics.

7. The electrical interface of claim 1, wherein said at least one electrical plug and said at least one electrical breaker is positioned substantially inside an interior volume of said non-conductive housing and said non-conductive housing is enclosed with tamper resistant hardware to prevent field disassembly.

8. The electrical interface of claim 1, wherein said non-conductive housing is comprised of a first part and a second part, said first part having a housing cavity and said second part fitting over and enclosing said housing cavity, said at least one electrical breaker and said at least one electrical plug substantially enclosed inside said housing cavity.

9. The electrical interface of claim 1, wherein said hollow pole is non-conductive.

10. The electrical interface of claim 1, wherein said non-conductive housing is further comprised of a first housing lid that is attached to said non-conductive housing via a hinge, said first housing lid closes to cover and protect said electrical outlet and said at least one electrical breaker and said at least one electrical plug.

11. A temporary electrical installation, comprising
   (a) a first non-conductive housing having an electrical outlet and an electrical switch positioned inside said first non-conductive housing, said electrical outlet accessed with an electrical plug-in device from a point exterior to said first non-conductive housing and said electrical switch switched on and off from a point exterior to said first non-conductive housing;
   (b) a non-conductive cover and a base, said non-conductive cover fits over and encloses said base to create a second non-conductive housing having a closed volume, said first non-conductive housing is positioned on an exterior surface of said non-conductive cover; and
   (c) electrical wiring extending from said first non-conductive housing into said closed volume of said second non-conductive housing, said electrical wiring electrically coupled to said electrical outlet and to said electrical switch, said electrical switch electrically coupled between said electrical outlet and said electrical wiring to selectively energize electrical outlet.

12. The temporary electrical installation of claim 11, wherein said non-conductive cover is comprised of materials selected from a group consisting of fiberglass, assorted polymer technologies, and plastics.

13. The temporary electrical installation of claim 11, further comprising securing hardware to secure an internal wiring harness to secure a distribution block inside said second non-conductive housing, said distribution block electrically coupled to said electrical wiring and to an electrical cable, said electrical cable electrically coupled to a permanent electrical facility.

14. The temporary electrical installation of claim 11, wherein said first non-conductive housing is further comprised of a first housing lid that is attached to said first housing via a hinge, said first housing lid closes to cover and protect said electrical outlet and said electrical switch.

15. The temporary electrical installation of claim 11, wherein said electrical outlet is selected from a group consisting of a 240 V Outlet and a GFCI Duplex Outlet.

16. The temporary electrical installation of claim 15, wherein said non-conductive housing and said hollow pole are substantially comprised of non-conductive material selected from a group consisting of fiberglass, assorted polymer technologies, and plastics.

17. The temporary electrical installation of claim 15, further comprising securing hardware to secure an internal wiring harness to hold a distribution block in said hollow pole, said distribution block receives an electrical cable electrically coupled to permanent electrical facilities and connects said electrical cable to said electrical wiring.

18. The temporary electrical installation of claim 11, wherein said electrical outlet, said electrical switch and said first non-conductive housing are combined to form a single unit in which said wiring to said plug and to said electrical switch is enclosed in said first non-conductive housing with tamper resistant hardware.

19. The temporary electrical installation of claim 11, wherein said electrical wiring extends through said exterior surface of said non-conductive cover.

20. A temporary electrical installation, comprising:
   (a) a hollow pole;
   (b) a non-conductive housing having an electrical outlet and an electrical switch positioned inside said first non-conductive housing, said electrical outlet accessed with an electrical plug-in device from a point exterior to said non-conductive housing, said electrical switch switched on and off from a position exterior to said non-conductive housing, said non-conductive housing positioned on an exterior surface of said hollow pole; and
   (c) electrical wiring extending from said first non-conductive housing into and through said hollow pole, said electrical wiring electrically coupled to said electrical outlet and to said electrical switch in a manner that said electrical switch can selectively energize electrical outlet.

21. The temporary electrical installation of claim 20, wherein said hollow pole is non-conductive.

22. The temporary electrical installation of claim 20, wherein electrical wiring extending through said exterior surface of said hollow pole.

23. The temporary electrical installation of claim 20, wherein said non-conductive housing is further comprised of a first housing lid that is attached to said non-conductive housing via a hinge, said first housing lid closes to cover and protect said electrical outlet and said electrical switch.

24. An electrical interface, comprising:
   (a) permanent electrical facilities that provide electrical power; and
   (b) a temporary electrical facility electrically connected to said permanent electrical facilities, said temporary electrical facility provides electrical utilities to construction sites, said temporary electrical facility comprising
      (b1) a non-conductive housing;
      (b2) at least one electrical breaker;
      (b3) at least one electrical plug, said at least one electrical breaker and said at least one electrical plug positioned in and enclosed within said non-conductive housing in such a manner that said at least one electrical breaker and said at least one electrical plug can be accessed from a position exterior to said non-conductive housing, said at least one electrical breaker electrically coupled to said permanent electrical facilities and to said at least one electrical plug in such a manner to selectively switch power to and from said at least one electrical plug; and
      (b4) a second non-conductive housing having an exterior surface, said non-conductive housing positioned on an exterior surface of said second non-conductive housing, said second non-conductive housing encloses a portion of electrical wiring electrically coupling said at least one electrical breaker and said at least one electrical plug to said permanent electrical facilities.

25. The electrical interface of claim 24, wherein said temporary electrical facility is linked to said permanent electrical facilities via an underground cable extending from said temporary electrical facility to said permanent electrical facilities, said underground cable is encased in conduit until said underground cable enters said second non-conductive housing.

26. The electrical interface of claim 24, wherein said second non-conductive housing is comprised of a base and a lid, which combine to form a closed volume, said portion of electrical wiring is placed in said closed volume.

27. The electrical interface of claim 26, wherein said base is selected from a group consisting of a hand hole and a pedestal transformer.

28. The electrical interface of claim 24, wherein said non-conductive housing also has a first housing lid that when in a closed position covers and protects said at least one plug and said at least one breaker.

29. The electrical interface of claim 28, wherein said first housing lid is attached to said non-conductive housing via a hinge.

30. The electrical interface of claim 24, wherein said non-conductive housing, said at least one electrical breaker, and said at least one electrical plug form a single unit that is attached to said exterior surface of said second non-conductive housing.

31. The electrical interface of claim 24, wherein said non-conductive housing is comprised of materials selected from a group consisting of fiberglass, assorted polymer technologies and plastics.

32. The electrical interface of claim 24, wherein said second non-conductive housing is comprised of materials selected from a group consisting of fiberglass, assorted polymer technologies, and plastics.

33. The electrical interface of claim 24, wherein said non-conductive housing is comprised of a first part and a second part, said first part having a housing cavity and said second part fitting over and enclosing said housing cavity, said at least one electrical breaker and at least one electrical plug substantially enclosed inside said housing cavity.

34. The electrical interface of claim 24, wherein said electrical wiring extends through said wiring extending through said exterior surface of said second non-conductive housing.

35. The electrical interface of claim 24, wherein said non-conductive housing is further comprised of a first housing lid that is attached to said non-conductive housing via a hinge, said first housing lid closes to cover and protect said electrical outlet and said at least one electrical breaker and said at least one electrical plug.

* * * * *